US008171555B2

(12) United States Patent
D'Mello et al.

(10) Patent No.: US 8,171,555 B2
(45) Date of Patent: May 1, 2012

(54) DETERMINING TECHNOLOGY-APPROPRIATE REMEDIATION FOR VULNERABILITY

(75) Inventors: Kurt D'Mello, Fairfax, VA (US); David Spencer Tyree, Centreville, VA (US); Eric David O'Brien, Leesburg, VA (US); Sudhir Gandhe, Fairfax, VA (US)

(73) Assignee: Fortinet, Inc., Sunnyvale, CA (US)

( * ) Notice: Subject to any disclaimer, the term of this patent is extended or adjusted under 35 U.S.C. 154(b) by 1411 days.

(21) Appl. No.: 10/897,399

(22) Filed: Jul. 23, 2004

(65) Prior Publication Data

US 2006/0021051 A1    Jan. 26, 2006

(51) Int. Cl.
*G06F 11/00* (2006.01)
*G06F 12/14* (2006.01)
*G06F 12/16* (2006.01)
*G08B 23/00* (2006.01)

(52) U.S. Cl. ............................................ 726/25
(58) Field of Classification Search .................. None
See application file for complete search history.

(56) References Cited

U.S. PATENT DOCUMENTS

| | | | |
|---|---|---|---|
| 5,850,446 A | 12/1998 | Berger et al. | |
| 6,088,804 A | 7/2000 | Hill et al. | |
| 6,282,546 B1 | 8/2001 | Gleichauf et al. | |
| 6,301,668 B1 | 10/2001 | Gleichauf et al. | |
| 6,385,317 B1 | 5/2002 | Rix et al. | |
| 6,389,538 B1 | 5/2002 | Gruse et al. | |
| 6,398,245 B1 | 6/2002 | Gruse et al. | |
| 6,513,122 B1 | 1/2003 | Magdych et al. | |
| 6,546,493 B1 | 4/2003 | Magdych et al. | |
| 6,711,127 B1 | 3/2004 | Gorman et al. | |
| 6,766,458 B1 | 7/2004 | Harris et al. | |
| 6,907,531 B1 | 6/2005 | Dodd et al. | |
| 6,912,521 B2 | 6/2005 | Kraft et al. | |
| 6,922,686 B2 | 7/2005 | Okamoto et al. | |
| 7,000,247 B2 | 2/2006 | Banzhof | |
| 7,013,395 B1 | 3/2006 | Swiler et al. | |
| 7,143,442 B2 | 11/2006 | Scarfe et al. | |
| 7,152,105 B2 * | 12/2006 | McClure et al. | 709/224 |
| 7,197,508 B1 | 3/2007 | Brown, III | |
| 7,260,844 B1 * | 8/2007 | Tidwell et al. | 726/22 |
| 7,694,337 B2 | 4/2010 | D'mello et al. | |
| 2002/0026591 A1 | 2/2002 | Hartley et al. | |

(Continued)

OTHER PUBLICATIONS

O'Brien et al., U.S. Appl. No. 60/573,056, filed May 21, 2004, all pages.*

(Continued)

*Primary Examiner* — Kaveh Abrishamkar
*Assistant Examiner* — Nadia Khoshnoodi
(74) *Attorney, Agent, or Firm* — Schwegman, Lundberg & Woessner, P.A.

(57) ABSTRACT

A machine-actionable memory comprises one or more machine-actionable records arranged according to a data structure. Such a data structure may include links that respectively map between: a RID field, the contents of which denote an identification (ID) of a remediation (RID); at least one TID field, the contents of which denotes an ID of at least two technologies (TIDs), respectively; and at least one ACTID field, the contents of which denotes an ID of an action (ACTID). A method, of selecting a remediation that is appropriate to a technology present on a machine to be remediated, may include: providing such a machine-actionable memory; and indexing into the memory using a given RID value and a given TID value to determine values of the at-least-one ACTID corresponding to the given RID value and appropriate to the given TID value.

12 Claims, 5 Drawing Sheets

U.S. PATENT DOCUMENTS

| | | | |
|---|---|---|---|
| 2002/0034302 A1 | 3/2002 | Moriai et al. | |
| 2002/0052877 A1 | 5/2002 | Okamoto et al. | |
| 2002/0087882 A1 | 7/2002 | Schneier et al. | |
| 2002/0104014 A1 | 8/2002 | Zobel et al. | |
| 2002/0116630 A1 | 8/2002 | Stehlin | |
| 2002/0147803 A1 | 10/2002 | Dodd et al. | |
| 2002/0166063 A1 | 11/2002 | Lachman, III et al. | |
| 2002/0188861 A1 | 12/2002 | Townsend | |
| 2003/0009694 A1 | 1/2003 | Wenocur et al. | |
| 2003/0037142 A1 | 2/2003 | Munger et al. | |
| 2003/0065945 A1 | 4/2003 | Lingafelt et al. | |
| 2003/0093669 A1 | 5/2003 | Morais et al. | |
| 2003/0115147 A1 | 6/2003 | Feldman et al. | |
| 2003/0115483 A1 | 6/2003 | Liang | |
| 2003/0126010 A1 | 7/2003 | Barns-Slavin | |
| 2003/0126472 A1 | 7/2003 | Banzhof | |
| 2003/0131256 A1 | 7/2003 | Ackroyd | |
| 2003/0135749 A1 | 7/2003 | Gales et al. | |
| 2003/0140250 A1* | 7/2003 | Taninaka et al. | 713/201 |
| 2003/0159060 A1 | 8/2003 | Gales et al. | |
| 2003/0163697 A1 | 8/2003 | Pabla et al. | |
| 2003/0204495 A1 | 10/2003 | Lehnert | |
| 2003/0204498 A1 | 10/2003 | Lehnert | |
| 2004/0025043 A1 | 2/2004 | Gallagher et al. | |
| 2004/0064722 A1 | 4/2004 | Neelay et al. | |
| 2004/0064726 A1 | 4/2004 | Girouard | |
| 2004/0088565 A1 | 5/2004 | Norman et al. | |
| 2004/0088581 A1 | 5/2004 | Brawn et al. | |
| 2004/0111613 A1 | 6/2004 | Shen-Orr et al. | |
| 2004/0143749 A1 | 7/2004 | Tajalli et al. | |
| 2004/0221176 A1 | 11/2004 | Cole | |
| 2004/0249712 A1 | 12/2004 | Brown et al. | |
| 2005/0005162 A1 | 1/2005 | Oliphant | |
| 2005/0022021 A1 | 1/2005 | Bardsley et al. | |
| 2005/0160480 A1 | 7/2005 | Birt et al. | |
| 2005/0229256 A2* | 10/2005 | Banzhof | 726/25 |
| 2006/0004800 A1 | 1/2006 | Okamoto et al. | |
| 2006/0010497 A1* | 1/2006 | O'Brien et al. | 726/26 |
| 2006/0018478 A1 | 1/2006 | Diefenderfer et al. | |
| 2006/0018485 A1 | 1/2006 | Diefenderfer et al. | |
| 2006/0021052 A1 | 1/2006 | D'Mello et al. | |
| 2006/0021053 A1 | 1/2006 | D'Mello et al. | |
| 2006/0053134 A1 | 3/2006 | Durham et al. | |
| 2006/0053265 A1 | 3/2006 | Durham et al. | |
| 2006/0053475 A1 | 3/2006 | Bezilla et al. | |
| 2006/0080738 A1 | 4/2006 | Bezilla | |
| 2006/0095792 A1 | 5/2006 | Hurtado et al. | |
| 2006/0259779 A2 | 11/2006 | Oliphant | |
| 2007/0256132 A2* | 11/2007 | Oliphant | 726/25 |

OTHER PUBLICATIONS

"CERT® Advisory CA-2001-37 Buffer Overflow in UPnP Service on Microsoft Windows", (Dec. 20, 2001), http://web.archive.org/web/20021214113234/www.cert.org/advisories/CA-2001-37.html, 4 pgs.

"US-CERT—Technical Cyber Security Alerts", (Jul. 13, 2005), http://www.us-cert.gov/cas/techalerts/index.html, 3 pgs.

"CERT/CC Advisories", (1988-Nov. 2002), http://web.archive.org/web/20021204080345http://www.cert.org/advisories/, 48 pgs.

"CERT/CC Advisories", (Nov. 2002-2004), http://www.cert.org/advisories/, 7 pgs.

"Anti-Vulnerability—Intrusion Detection System (IDS)", *Security Profiling, Inc., White. Paper Version 1.0, Rev. A*, [Online]. [Archived Apr. 9, 2003]. Retrieved from the Internet: http://web.archive.org/web/20030409162639/www.securityprofiling.com/pdf/IDSPaperv1-0.pdf>, 37 pgs.

"U.S. Appl. No. 10/897,402, Final Office Action mailed May 5, 2008", 11 pgs.

"U.S. Appl. No. 10/897,402, Non-Final Office Action mailed Oct. 10, 2007", 12 pgs.

"U.S. Appl. No. 10/897,402, Response filed Feb. 8, 2008 to Non-Final Office Action mailed Oct. 10, 2007", 13 pgs.

"U.S. Appl. No. 10/897,402, Response filed Aug. 5, 2008 to Final Office Action mailed May 8, 2008", 14 pgs.

"U.S. Appl. No. 10/944,406, Non-Final Office Action mailed Mar. 28, 2008", 10 pgs.

"U.S. Appl. No. 10/944,406, Response filed Jun. 29, 2008 to Non-Final Office Action mailed Mar. 28, 2008", 17 pgs.

"U.S. Appl. No. 10/963,766, Advisory Action mailed Jul. 25, 2008", 3 pgs.

"U.S. Appl. No. 10/963,766, Final Office Action mailed May 15, 2008", 15 pgs.

"U.S. Appl. No. 10/963,766, Non-Final Office Action mailed Sep. 29, 2008", 19 pgs.

"U.S. Appl. No. 10/963,766, Non-Final Office Action mailed Dec. 6, 2007", 18 pgs.

"U.S. Appl. No. 10/963,766, Preliminary Amendment mailed Apr. 14, 2005", 7 pgs.

"U.S. Appl. No. 10/963,766, Response filed Mar. 6, 2008 to Non-Final Office Action mailed Dec. 6, 2007", 16 pgs.

"U.S. Appl. No. 10/963,766, Response filed Jul. 15, 2008 to Final Office Action mailed May 15, 2008", 15 pgs.

"U.S. Appl. No. 11/105,363, Preliminary Amendment mailed Apr. 14, 2005", 7 pgs.

"NETECT (Netecting Network Security)—Company Profile", [Online]. Retrieved from the internet: <URL: www.netect.com>, (1998), 5 pgs.

"SysUpdate—Patch Management with the Policy Compliance & Enforcement (PC&E) Module", *Security Profiling, Inc., White Paper—Version 4.2*, [Online]. [Archived Feb. 13, 2004]. Retrieved from the internet: <URL: http://web.archive.org/web/20040213185001/http://www.securityprofiling.com/pdf/sysupdate_wp.pdf>, (Oct. 1, 2003), 37 pgs.

"U.S. Appl. No. 10/897,402, Non-Final Office Action mailed Oct. 29, 2008", 15 pgs.

"U.S. Appl. No. 10/897,402, Response filed Mar. 3, 2009 to Non-Final Office Action mailed Oct. 29, 2008", 12 pgs.

"U.S. Appl. No. 10/944,406, Final Office Action mailed Oct. 29, 2008", 19 pgs.

"U.S. Appl. No. 10/963,766, Final Office Action mailed Mar. 10, 2009", 24 pgs.

"U.S. Appl. No. 11/105,363 Non-Final Office Action mailed Jan. 12, 2009", 22 pgs.

"U.S. Appl. No. 10/897,402, Final Office Action mailed May 27, 2009", 15 pgs.

"U.S. Appl. No. 10/897,402, Notice of Allowance mailed Jan. 14, 2010", 7 pgs.

"U.S. Appl. No. 10/897,402, Response filed Oct. 27, 2009 to Final Office Action mailed May 27, 2009", 15 pgs.

"U.S. Appl. No. 10/944,406, Notice of Allowance mailed Nov. 17, 2009", 13 pgs.

"U.S. Appl. No. 10/944,406, Response filed Jun. 26, 2009 to Final Office Action mailed Oct. 29, 2008", 15 pgs.

"U.S. Appl. No. 10/963,766, Response filed Dec. 20, 2008 to Non Final Office Action mailed Sep. 29, 2008", 14 pgs.

"U.S. Appl. No. 12/765,431, Non Final Office Action mailed Sep. 15, 2011", 10 pgs.

* cited by examiner

DETERMINING TECHNOLOGY-APPROPRIATE REMEDIATION FOR VULNERABILITY

BACKGROUND OF THE PRESENT INVENTION

Attacks on computer infrastructures are a serious problem, one that has grown directly in proportion to the growth of the Internet itself. Most deployed computer systems are vulnerable to attack. The field of remediation addresses such vulnerabilities and should be understood as including the taking of deliberate precautionary measures to improve the reliability, availability, and survivability of computer-based assets and/or infrastructures, particularly with regard to specific known vulnerabilities and threats.

Remediation is based upon knowledge of vulnerabilities. There are many sources of information regarding vulnerabilities, which can be organized into three source categories: non-fee-based open source; non-fee-based computer-vendor; and fee-based vulnerability assessment vendor (VAV). Among the non-fee-based open-sources, the CERT® Coordination Center (hereafter, CERT®), which was the first computer security incident response team (established in November 1988 after a Cornell University graduate student released the "Morris Worm," which brought down much of the Internet and demonstrated the growing network's susceptibility to attack), provides some of the most complete information available about computer system vulnerabilities. For example, an incident report from CERT® about a vulnerability generally includes: a description of it (and typically a list of one or more identifiers associated with it); a characterization of its impact upon a susceptible system; one or more suggested remediations ("solutions" according to CERT® phraseology); and links to other sources of information about it.

SUMMARY OF THE PRESENT INVENTION

At least one embodiment of the present invention provides a machine-actionable memory comprising one or more machine-actionable records arranged according to a data structure. Such a data structure may include links that respectively map between: a RID field, the contents of which denote an identification (ID) of a remediation (RID); at least one TID field, the contents of which denotes an ID of at least two technologies (TIDs), respectively; and at least one ACTID field, the contents of which denotes an ID of an action (ACTID). At least one other embodiment of the present invention provides a machine having such a memory.

At least one other embodiment of the present invention provides a method of selecting a remediation that is appropriate to a technology present on a machine to be remediated. Such a method may include: providing a machine-actionable memory as mentioned above; and indexing into the memory using a given RID value and a given TID value to determine values of the at-least-one ACTID corresponding to the given RID value and appropriate to the given TID value.

At least one other embodiment of the present invention provides a machine-readable medium comprising instructions, execution of which by a machine selects a remediation that is appropriate to a technology present on a machine to be remediated, as in the selection method mentioned above. At least one other embodiment of the present invention provides a machine configured to implement the selection method mentioned above.

At least one other embodiment of the present invention provides a method of determining one or more technology-appropriate remediations for a common aspect of vulnerability. Such a method may include: receiving one or more vulnerability identifications (VIDs) and descriptions thereof, respectively, that have a common aspect of vulnerability; determining a remediation identification (RID) associated with the common aspect of vulnerability; creating, based upon the one or more VIDs and the descriptions thereof, a machine-actionable map between the RID, one or more technology identifications (TIDs), and one or more action identifications (ACTIDs) for actions that remediate the common aspect of vulnerability represented by the RID, where the map is a representation of the remediation candidate.

Additional features and advantages of the present invention will be more fully apparent from the following detailed description of example embodiments, the accompanying drawings and the associated claims.

BRIEF DESCRIPTION OF THE DRAWINGS

The drawings are: intended to depict example embodiments of the present invention and should not be interpreted to limit the scope thereof. In particular, relative sizes of the components of a figure may be reduced or exaggerated for clarity. In other words, the figures are not drawn to scale.

DETAILED DESCRIPTION OF EXAMPLE EMBODIMENTS

In developing the present invention, the following problems with the Background Art were recognized and a path to a solution identified. There are at least two problems associated with the vulnerability information currently available from the Background Art sources, e.g., from CERT First, none of the suggested remediations is provided in an substantially machine-actionable, much less an automatically-machine-actionable format. Rather, the suggested remediation is presented in prose that requires substantial involvement of a human participant in order to implement. Second, the suggested remediations typically do not address the nuances of their implementations across significantly different technologies (e.g., UNIX in the context of an Intel® architecture versus a Motorola® architecture), much less closely related technologies (e.g., Windows® 32 bit vs. 64 bit architectures in the context of an Intel® architecture, or Windows® 2000 vs. Windows® 98 vs. Windows NT®, etc.). A mechanism (here, the computer-context of mechanism is being used, which derives from the machine metaphor used in sciences concerned with man) which can facilitate translation of the plethora of suggested remediations and their related information into a machine-actionable format would help the consolidation and accessibility of such information. Also, a mechanism which can facilitate differentiation of related remediations according to technology would improve the practicality of the suggested remediations. Respective embodiments of the present invention provide such mechanisms.

Figure 1:
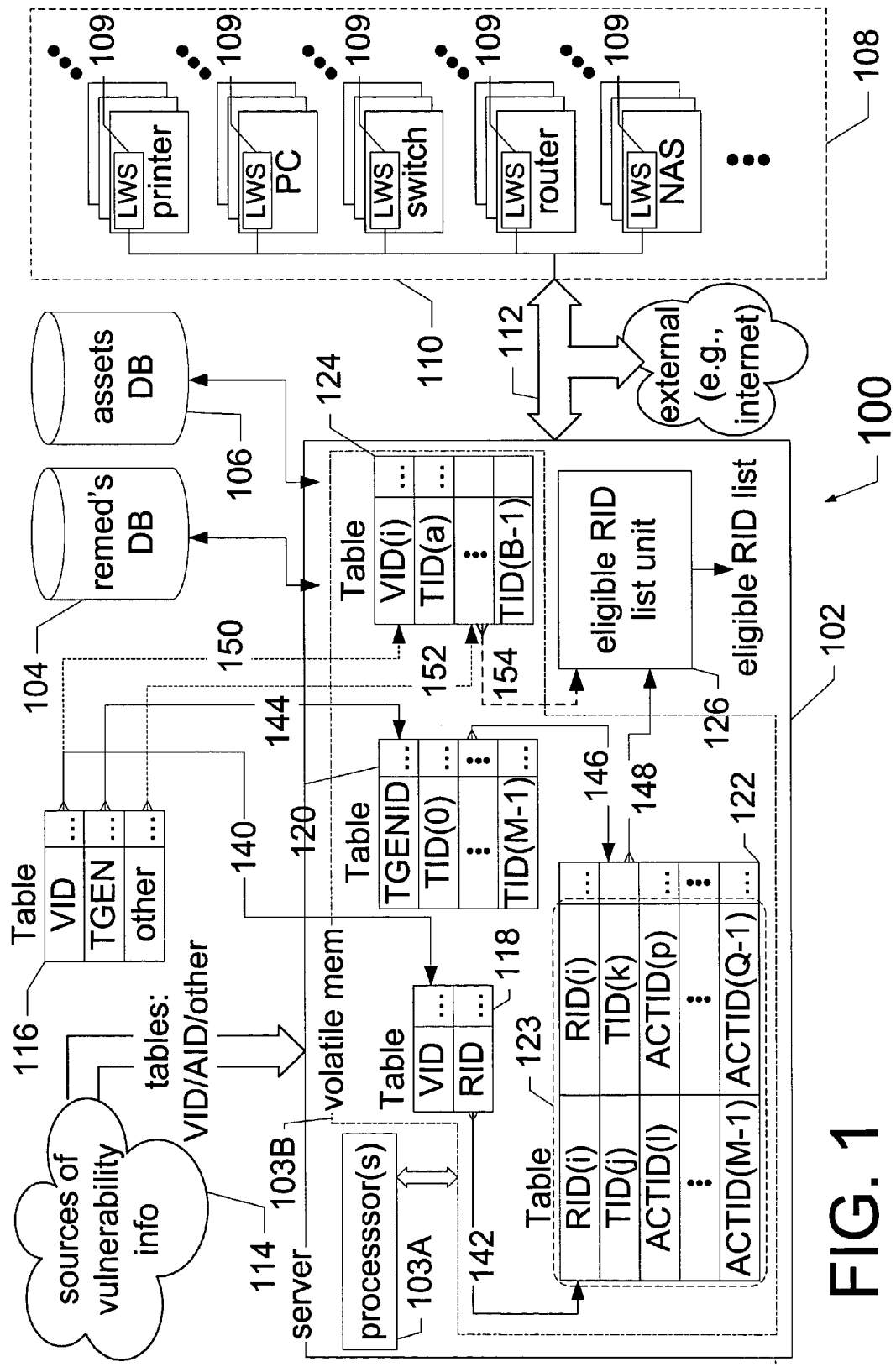
FIG. 1 is a block diagram of an architecture 100 for a remediation system into which embodiments of the present invention can be incorporated, making system 100 itself represent at least one embodiment of the present invention.

FIG. 1 is a block diagram of an architecture 100 for a remediation system into which embodiments of the present invention can be incorporated, making system 100 itself represent at least one embodiment of the present invention.

Architecture 100 includes: a server 102 (having one or more processors 103A and a volatile memory 103B); a database (DB) of remediations 104; a DB of assets 106; a group 108 of networked assets, where generalized networked communication is represented by path 112; and various known sources of vulnerability information 114. Examples of assets in group 108 include printers, computers (also referred to as PCs), switches, routers, network-attached storage (NAS) devices, etc. Group 108 can be generalized as including devices having some measure of program-code-based operation, e.g., software, firmware, etc., which can be manipulated in some way via an instance of a communication, e.g., arriving via path 12, and as such can be vulnerable to attack.

Server 102 can be a component of the network to which group 108 represents assets. DBs 106 and 108 can be local non-volatile memory resources of server 102. Remediation DB 106 can be a local copy of a corresponding remediation DB created, maintained and/or updated by a remote remediation service provider.

Each of the various networked assets in group 108 is depicted as including a light weight sensor (LWS) 109. Each LWS 109 and server 102 adopt a client-server relationship. Operation of each LWS 109 can include gleaning information about its host-asset and sending such information to server 102; and receiving remediations in an automatically-machine-actionable format from server 102 and automatically implementing the remediations upon its host-asset.

Such an automatically-machine-actionable remediation can take the form of a sequence of one or more operations that automatically can be carried out by the host asset. Such operations can be invoked by one or more machine-language commands, e.g., one or more Java byte codes.

Server 102 prepares and sends remediations to the various assets of group 108 based upon vulnerability information received from sources 114 thereof, remediation database 104 and asset database 106. At an intermediate stage in the preparation, an eligible remediation identification (RID) list unit 126 in server 102 produces a list of eligible RIDs. Unit 126 can be a part of the one or more processors 103A.

Tables 118, 120, 122 and 124 are depicted in server 102 to represent how server 102 uses information in DBs 104 and 106 to generate the inputs to unit 126. Tables 118-124 can represent copies, that are kept in volatile memory (not depicted) of server 102, of some or all of the data in DBs 104 and 106. Or, tables 118-124 can merely be a symbolic depiction of a database query to DBs 104 and 106, respectively.

The vulnerability information from sources 114 can be in the form of tables 116 or easily tabulated into tables 116. Regardless, tables 116 generally do not contain much in the way of machine-actionable data. Each table 116 describes a given vulnerability and will typically include at least: a field for a vulnerability identification number (VID), a field for a prose technology genus (TGEN); and a field for a prose description of the vulnerability. By analyzing tables 116, each of table 118 and table 120 can be developed, as will be discussed below.

Table 118 maps VIDs used by sources 114 to corresponding remediation identification numbers (RIDs) according to some common aspect of vulnerability, respectively. In table 118, many remediations can map to one vulnerability, and many vulnerabilities can map to one remediation. Table 118 can be indexed using a given VID, e.g., VID1, to obtain the corresponding RID, e.g., RID1, as reflected by paths 140 and 142 in FIG. 1.

Table 120 maps TGEN identification numbers (TGENIDs) to identification numbers of technology species thereof (TIDs). The relationships in table 120 can be analogized to the more familiar tree hierarchy.

Figure 3:
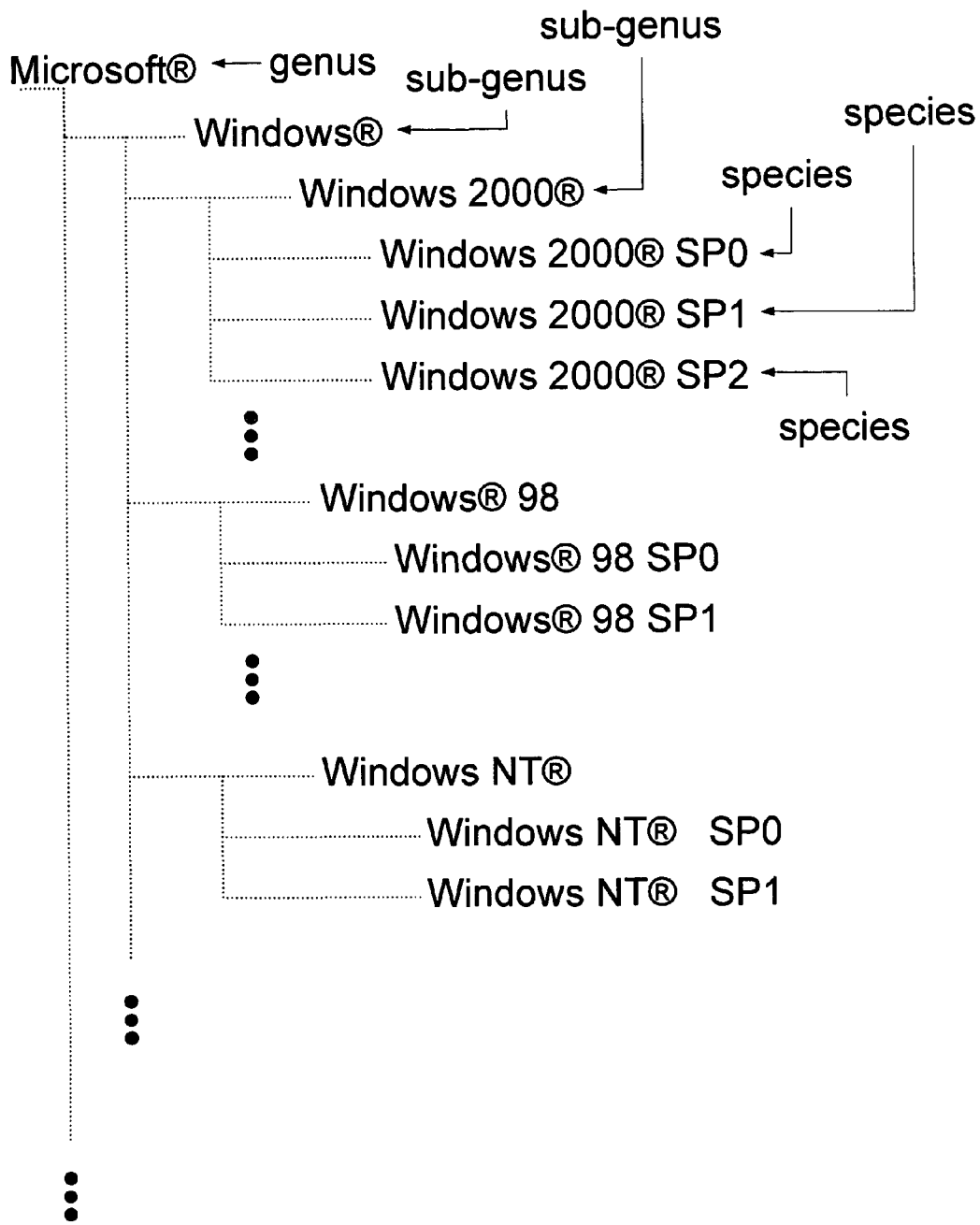
FIG. 3 is a tree-hierarchy diagram illustrating genus/sub-genus/ . . . /species relationships in which the species would be assigned TIDs, according to at least one embodiment of the present invention.

FIG. 3 is a tree-hierarchy diagram illustrating genus/sub-genus/ . . . /species relationships in which the species would be assigned TIDs, according to at least one embodiment of the present invention. In particular, FIG. 3 assumes an example of the Microsoft® Corporation and its Windows® family of operating systems. In FIG. 3, Microsoft® is the genus, Windows® is a sub-genus, Windows® 2000 is a sub-genus reporting to Windows®, Windows® 2000 SP0 is a first species, Windows® 2000 SP1 is a second species, Windows® 2000 SP2 is a second species, etc.

Again, table 120 represents a mapping of genus/sub-genus/ . . . /species relationships that can be found in a tree-hierarchy diagram. Upon determining the TGENID for the TGEN of table 116, table 120 can be indexed (see path 144) using the TGENID to obtain (see path 146) the corresponding one or more TIDs, TID(0), . . . , TID(M-1).

Table 122 is a table of remediations that can be obtained via use of the mechanism (mentioned above and discussed further below) that facilitates translation of the plethora of suggested remediations and their related information into a machine-actionable format, and via use of the mechanism (mentioned above and discussed further below) that facilitates differentiation of related remediations according to technology. For a given remediation RID, table 122 provides one or more action identification numbers (ACTIDs) corresponding to actions that, in combination, can mitigate a corresponding vulnerability. Depending upon the technology TID, the group of one or more action ACTIDs for a remediation RID might differ. In table 122, dashed rectangle 123 encompasses a group of ACTIDs, namely ACTID(I), . . . , ACTID(M-1), that correspond to technology TID(j) for a given vulnerability.

Table 122 can be constructed, e.g., by analyzing, coordinating and distilling the information in tables 116 (obtained, again, from sources 114). In particular, one performing such analyzing, coordinating and distilling should be alert to recognizing any aspects of relatedness for two or more of tables 116 so that such relatedness can be translated into relational links that include: links between VIDs & RIDs; and RIDs, TIDs and groups of ACTIDs whose correspondence to the RIDs exhibits variation in dependence upon the TIDs, respectively.

Table 122 can be indexed with the RID output of table 118 (see path 142) and the one or more TIDs output from table 120 (see path 146) in order to obtain a collection of RIDs that might mitigate the vulnerability VID of table 116. This collection of RIDs is provided to unit 126, which filters the collection to obtain a list of RIDs that are eligible for deployment to LWSs 109 that are deployed on the assets of group 108.

It should be understood that table 122 in FIG. 1 includes one or more machine-actionable records (a type of map implementation) 123 arranged according to a data structure, where the data structure includes links that respectively map between: a RID field, the contents of which denote an identification (ID) of a remediation (RID); at least one TID field, the contents of which denotes an ID of at least two technologies (TIDs), respectively; and a at least one ACTID field, the contents of which denote IDs of actions (ACTIDs), respectively.

More particularly, at least one of the data structures in table 122 further includes: a plurality of ACTID fields, the contents of which denote ACTIDs, respectively; at least one SS link relating the plurality of ACTID fields; at least one T-SS link between the at-least-one TID field and the at-least-one subset, respectively; and at least on R-SS link between the RID field and the at-least-one subset.

Typically, but not necessarily, the data structure for records in table 122 would include at least two of the TID fields, the contents of which denote least two TIDs, respectively. Similarly typically, but not necessarily, the data structure for records in table 122 would include: two or more of the SS links, the two-or-more SS links relating one or more of the plurality of ACTID fields as subsets, respectively, of the plurality of ACTID fields; at least two of the T-SS links, the at-least two T-SS links being between the at-least-two TID fields and the two-or-more subsets, respectively; and at least two of the R-SS links, the at-least-two R-SS links being between the RID field and the two-or-more subsets, respectively.

Table 122 optionally can be expanded to include a field, the contents of which denote a value that is indicative of a degree to which implementing the remediation on a machine is invasive thereof (hereafter, an invasiveness value). The invasiveness-value corresponding to the invasiveness field can represent a point on a continuum of invasiveness which, e.g., classifies patching an operating system as being a more invasive type of remediation and classifies editing a file as being a less invasive type of remediation. Such a continuum of invasiveness could also classify editing a registry value as being a moderately invasive type of remediation.

Occasionally, an instance of table 116 is sufficiently detailed such that one or more TIDs can be identified and a mapping (as indicated by paths 150 and 152) made therebetween. Table 124 represents the result of such a mapping. Table 124 can be indexed using a given VID to obtain a list of one or more corresponding TIDs, if such a list exists. Then the list is provided to unit 126.

Figure 4:
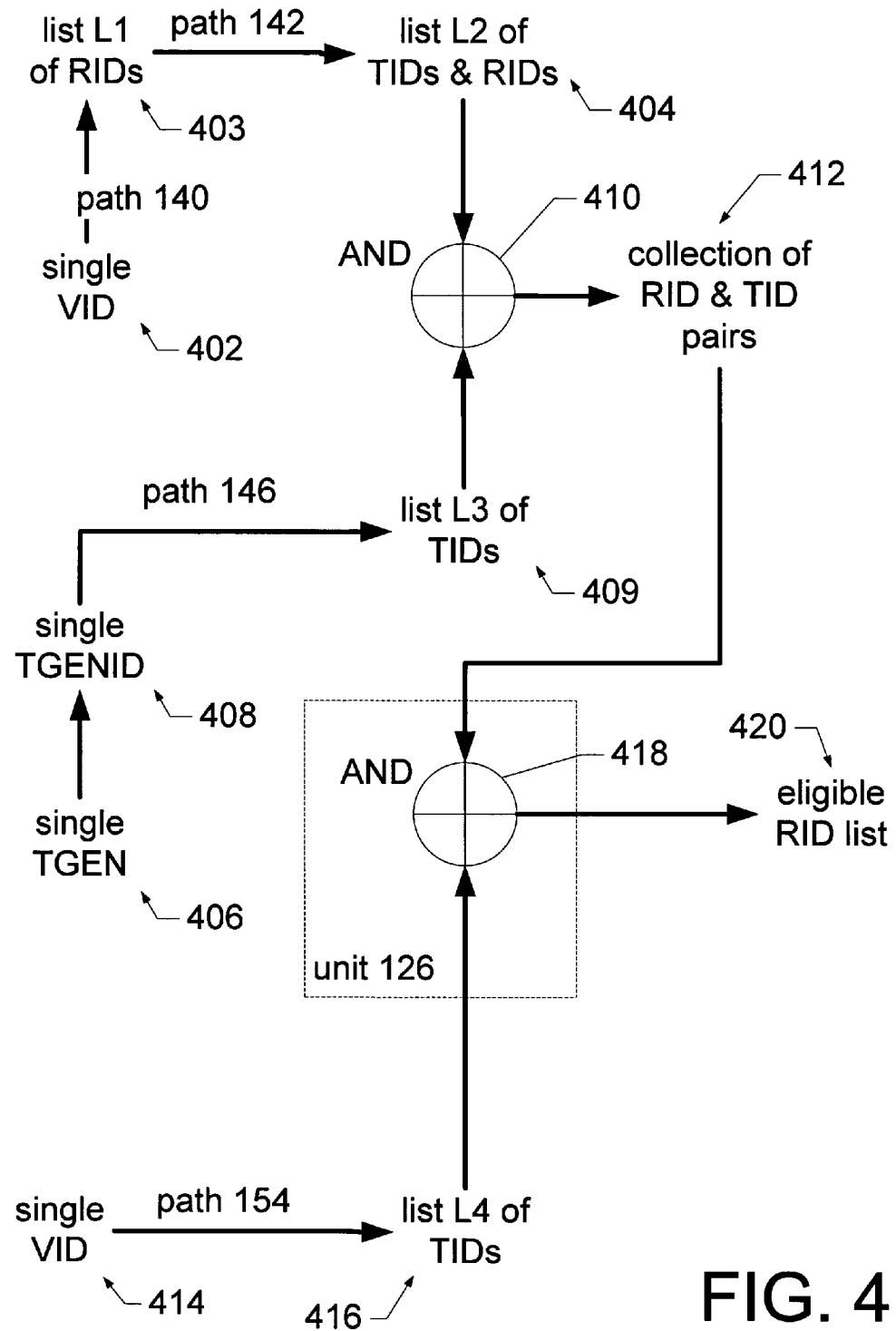
FIG. 4 is a flow diagram illustrating a method for obtaining an eligible RID list can be obtained, according to at least one embodiment of the present invention.

FIG. 4 is a flow diagram illustrating a method for obtaining an eligible RID list can be obtained, according to at least one embodiment of the present invention.

At reference No. 402, a single VID is obtained from, e.g., an instance of a table 116. Table 118 is then indexed (see path 140) using the single VID to obtain a list L1 of RIDs at reference No. 403. If this is the first instance of encountering the VID, then it is determined whether an aspect of the vulnerability is common to any other VIDs. If not, then this is a circumstance in which a new remediation arises for which a new RID is assigned to the vulnerability. But if there is an aspect to the current vulnerability that is common to at least one other VID, then the current VID is assigned to the RID associated with the common aspect of vulnerability.

List L1 (obtained at 403) is then used to index (see path 142) into table 122 to obtain a list L2 of TIDs & RIDs at reference No. 404. At reference No. 406, a single TGEN is obtained from, e.g., the same instance of table 116. At reference No. 408, the TGENID corresponding to the TGEN of 406 is obtained. Typically, the TGEN will have been encountered before such that the corresponding TGENID will already exist. But if not, then a new TGENID is generated.

The TGENID of 408 is used to index (see path 144) into table 120 to obtain a list L3 of TIDs at reference No. 409. As indicated by symbol 410 (representing a logical AND operation), lists L2 and L3 are ANDed together, e.g., in the context of a database operation. Assuming that sets of parameters are associated with records, respectively, then a database type of AND operation is typically performed upon a subset of the parameters, and all parameter members of the sets associated with the records indicated by the AND operation are retained, not just the parameters upon which the AND operation is conducted.

The result obtained at AND 410 is a reduced collection of RID & TID pairs at reference No. 412. Meanwhile, at reference No. 414, the same single VID is indexed (see path 150) into table 124 to obtain at reference No. 416 a list L4 (if available) of TIDs corresponding to the single VID. As indicated by logical AND symbol 418, the collection and list L4 are ANDed together (e.g., in the database sense of an AND operation) to obtain an eligible RID list at reference No. 420.

Each RID indicated as eligible by its presence on the list can be differentiated according to TID so as to yield, potentially, different groups of ACTIDs for different TIDs even though the RID is the same. This can be described as variations of the RID. As such, each RID on the eligible-list exhibits or carries forward the robustness of the mapping represented by table 122.

Alternative patterns of flow in FIG. 4 are possible. It is noted that list L2 is used to reduce (typically, but not necessarily) the number of TIDs on list L2, and then subsequently list L4 is used to reduce (typically, but not necessarily) the number of TIDs in the collection. As an example of an alternative, list L4 could be used at first to reduce (typically, but not necessarily) list L2, and then subsequently list L3 could be used for further reduction (which is typically, but not necessarily expected to result). Other alternatives are possible.

In other words, FIG. 4 is a flow diagram of a method (according to at least one embodiment of the present invention) for selecting a remediation that is appropriate to a technology present on a machine to be remediated. Such a method includes: providing a machine-actionable memory that includes one or more machine-actionable records like, e.g., table 122; and indexing into the memory using a given RID value and a given TID value to determine values of one or more ACTIDs corresponding to the given RID value and appropriate to the given TID value. The given RID value can be obtained upon receiving a VID and determining, e.g., via using table 118, a RID associated/mapped-to the VID.

Figure 2A:
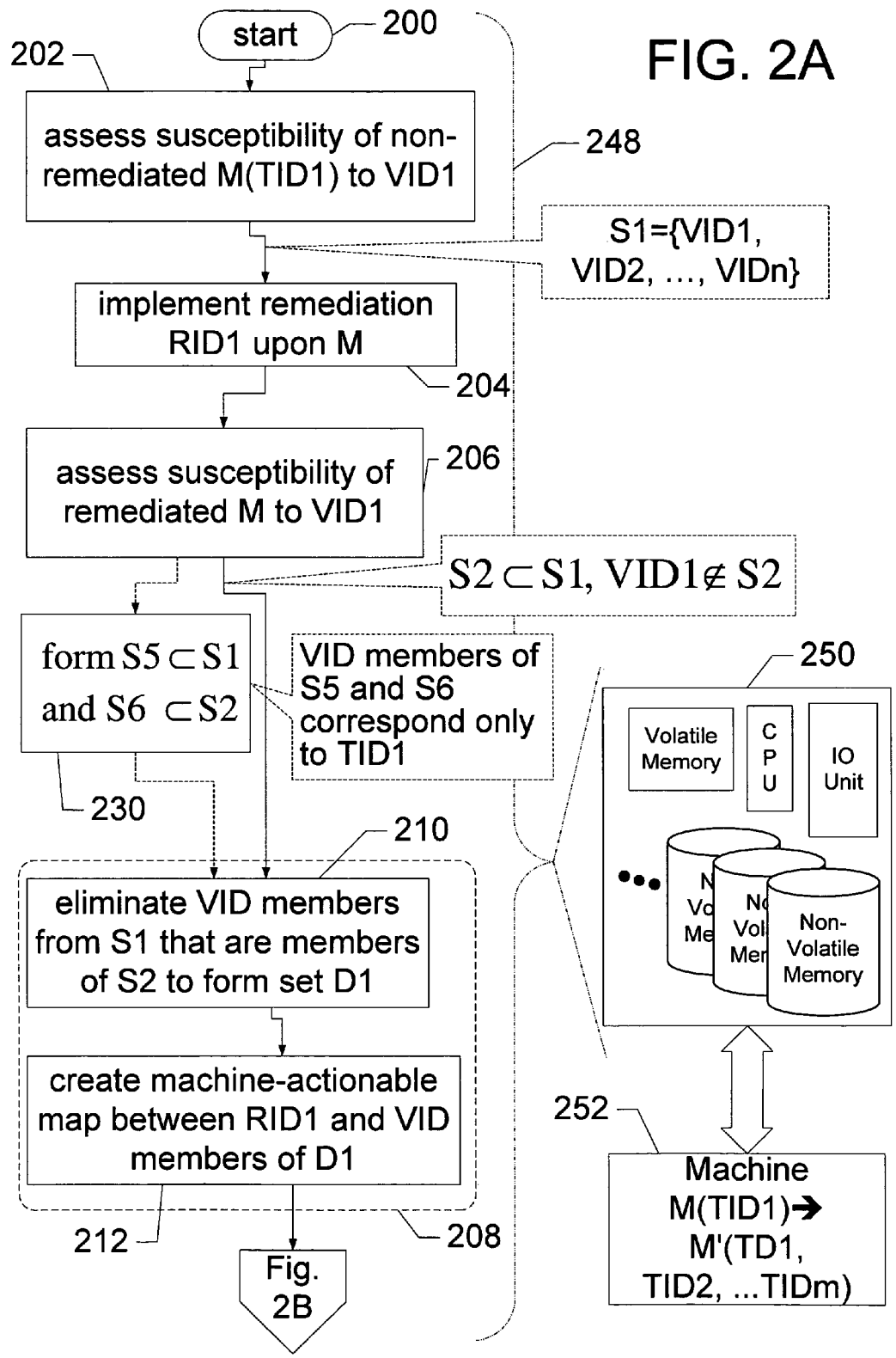
FIGS. 2A-2B are flowcharts that depict such a mechanism that facilitates translation of the plethora of suggested remediations and their related information into a machine-actionable format in the form of a method of mapping a remediation to a plurality of vulnerabilities, according to at least one embodiment of the present invention.
Figure 2B:
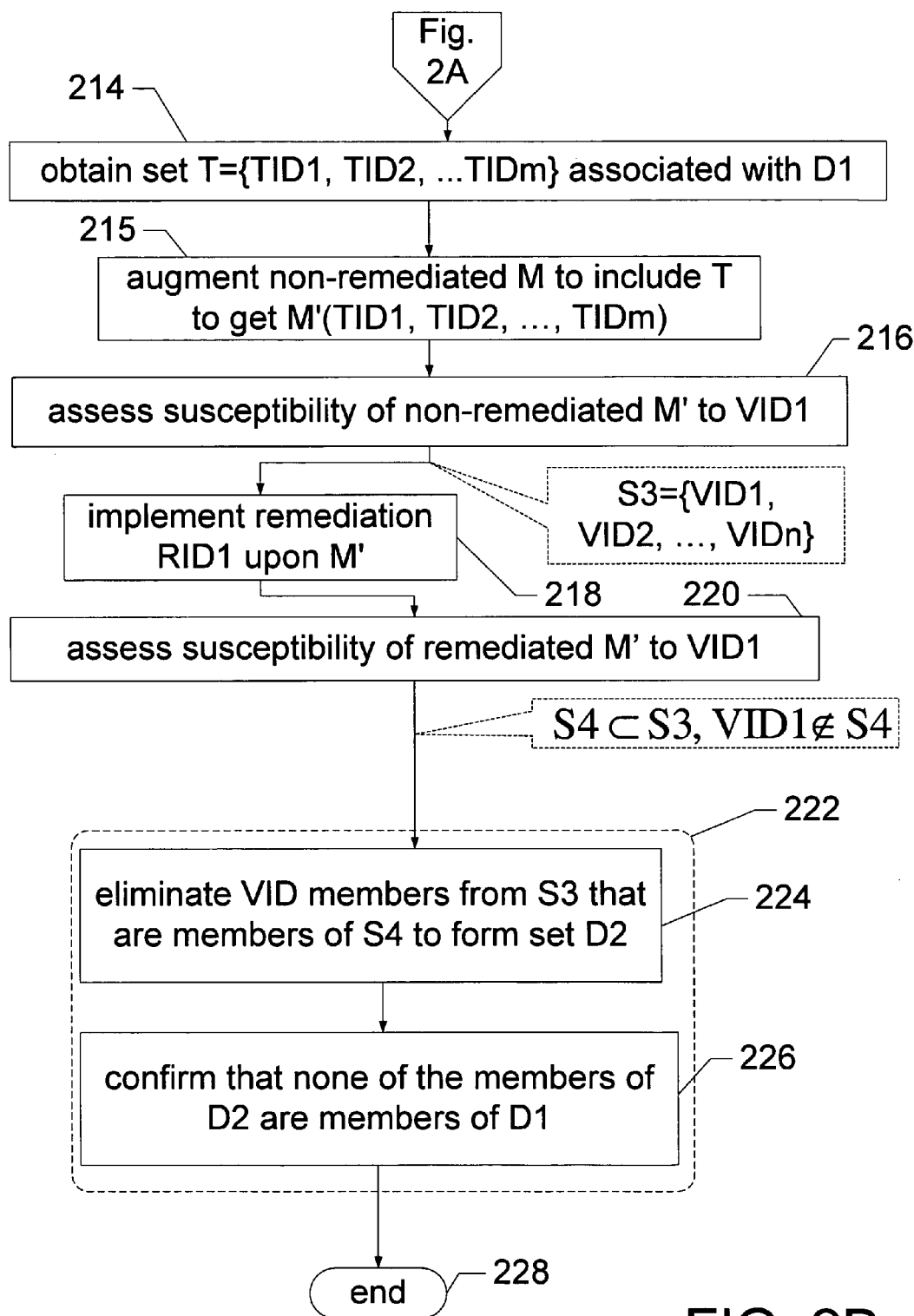

FIGS. 2A-2B are flowcharts that depict such a mechanism (namely, that facilitates translation of the plethora of suggested remediations and their related information) into a machine-actionable format in the form of a method of mapping a remediation to a plurality of vulnerabilities, according to at least one embodiment of the present invention. In developing the present invention, it was recognized that a remediation that works for a first vulnerability typically works for multiple vulnerabilities. This is contrary to the thinking of the Background Art, which presumes a 1:1 relationship between a vulnerability and a remediation.

In FIG. 2A, flow begins at block 200 and goes to block 202, where the susceptibility of a machine, M, to a given vulnerability having VID1 is assessed. It is assumed that a remediation having remediation identification (RID) 1 (RID1) has been identified for VID1.

Because information concerning a vulnerability that is provided according to the Background Art typically does not address the nuances of implementing a suggested remediation across different technologies, it was recognized (during development of the present invention) that it is prudent to confirm that a specific technology is susceptible to a particular vulnerability. For example, assume a vulnerability is described for the Windows® operating system. Let's refer to the Windows® operating system as a technology genus. A prudent approach tests a machine (a test-subject) configured to each of the technology species of the genus (and any sub-species) because species susceptibility is not necessarily true where genus susceptibility is initially indicated. Continuing the example, some species technologies that should be tested for susceptibility to vulnerability VID1 include: Windows® 2000 service pack zero (SP0); Windows® 2000 SP1; Windows® 2000 SP2, etc.; Windows® 98 SP0; Windows® 98 SP1; etc.; Windows NT® SP0; Windows NT® SP1; etc.

In FIG. 2A, the test-subject is depicted as a machine M (252) that has been configured initially to a particular technology TD1, and is bidirectionally coupled to a tester-host 250. Tester-host 250 can be a typical computer (also referred to as a PC). Typical hardware components for tester-host 250 include a CPU/controller, an I/O unit, volatile memory such as RAM and non-volatile memory media such disk drives and/or tape drives, ROM, flash memory, etc.

Susceptibility testing can correspond to some of the aspects of a method represented by blocks 200-230 of FIGS. 2A-2B, which can be implemented via software that runs on tester-host 250. This relationship between blocks 200-230 and tester-host 250 is depicted by a bracket 248 in FIG. 2A that calls out blocks 200-212. For simplicity of depiction, neither a corresponding bracket nor tester-host 250 has been depicted in FIG. 2B.

In block 202, it is assumed that non-remediated machine M (252) has been configured to include at least technology TID1. Tester-host 250 scans non-remediated machine M (252) to assess its susceptibility to vulnerability VID1 using known vulnerability scanning software. In most instances where susceptibility to vulnerability VID1 is confirmed, one or more additional vulnerabilities (e.g., VID2, . . . , VIDn) of machine M (252) are identified. The result of the scan can be organized as a first set, S1, of vulnerabilities.

$$S1=\{VID1, VID2, \ldots, VIDn\} \quad (1)$$

Flow proceeds to block 204, where tester-host 250 implements remediation RID1 upon machine M (252). Next, at block 206, tester-host 250 scans remediated machine M (252) to assess its susceptibility to vulnerability VID1. Typically, the remediation will mitigate (reduce or eliminate) the susceptibility. The testing of block 206, in effect, confirms the efficacy of the remediation if VID1 is no longer present in the output of the scan. As before, the scan output is organized as a second set, S2, of vulnerabilities that, typically, is a subset of the first set. S2 could, but will not necessarily, be empty.

$$S2 \subset S1, \text{ where } VID1 \notin S2 \quad (2)$$

Flow proceeds to block 208, where tester-host 250 creates a mapping between RID1 and two or more VID members of S1 based upon differences between S1 and S2. This mapping is reflected in table 118 of FIG. 1. In more detail, block 208 can include blocks 210 and 212. Flow can proceed from block 206 to block 210, where tester-host 250 (or another computer having access to S1 and S2) eliminates VID members of S1 that are also members of S2. This forms a remainder set D1.

$$D1 \subset S1, \text{ where } VIDi \in D1 \text{ but} \notin S2 \quad (3)$$

At block 212, tester-host 250 (or another computer having access to S1 and S2) can create the mapping to be between RID1 and the VID members of set D1.

According to the thinking in the Background Art, only one remediation is associated with one vulnerability. As such, the VID members of S1 other than VID1 are of no concern to the Background Art. To use an analogy, the Background Art would view the VID members of S1 other than VID1 as the chaff from which a kernel of wheat (VID1) is to be separated. The Background Art would fail to recognize that (typically) there are one or more other kernels of wheat in the chaff. The flowchart of FIG. 2A illustrates a method of gleaning the chaff to obtain the extra wheat. Those extra kernels of wheat are the VID members of set D1 other than VID1. The other members of set D1 correspond to other vulnerabilities that remediation RID1 can mitigate. An advantage to the mapping of block 212 is that it can substantially increase the arsenal of remediations available and/or significantly reduce the number of remediations needed to mitigate a collection of vulnerabilities.

FIG. 2B is a continuation of FIG. 2A. FIG. 2B extends the method of FIG. 2A to include testing that confirms the efficacy of RID1 for the VID members of set D1. Flow can proceed from block 208/212 of FIG. 2A to block 214 of FIG. 2B, where tester-host 250 (or another computer having access to S1 and S2) determines what additional technologies beyond TID1 are associated with the member VIDs of D1 in order to form a set, T.

$$T=\{TID1, TID2, \ldots, TIDm\} \quad (4)$$

At block 215, tester-host 250 augments non-remediated machine M (252) to add technologies TID2, . . . , TIDm of set T, resulting in a second version M' of machine M (252). At block 216, tester-host 250 scans non-remediated machine M' (252) to assess its susceptibility to vulnerability VID1. As before, this should yield a third set S3 that is the same as or similar to S1.

$$S3=\{VID1, VID2, \ldots, VIDn\} \quad (5)$$

Flow proceeds to block 218, where tester-host 250 implements remediation RID1 upon machine M' (252). Next, at block 220, tester-host 250 scans remediated machine M' (252) to assess its susceptibility to vulnerability VID1. Typically, the remediation will mitigate the susceptibility to all of the vulnerabilities of residual set D1. The testing of block 220, in effect, confirms the efficacy of the remediation if all of the member VIDs of set D1 are no longer present in the output of the scan. As before, the scan output, typically, is a subset S4 of the third set S3. S4 could, but will not necessarily, be empty.

$$S4 \subset S3, \text{ where } VID1 \notin S4 \quad (6)$$

Flow proceeds to block 222, where tester-host 250 verifies that remediation RID mitigates all of the VID members of set D1. More particularly, block 222 can include blocks 224 and 226. Flow can proceed from block 220 to block 224, where tester-hoster 250 (or another computer having access to S1 and S2) eliminates VID members of set S3 that are also members of set S4. This forms a remainder set D2.

$$D2 \subset S3, \text{ where } VIDi \in D2 \text{ but} \notin S4 \quad (7)$$

At block 226, tester-host 250 confirms that none of the VID members of set D2 are present in set D1, e.g., by verifying that the intersection of sets D1 and D2 is empty.

$$D1 \cap D2 = \emptyset \quad (8)$$

After block 222/226, flow ends at block 228.

In FIG. 2A, sets S1 and S2 can include vulnerabilities that correspond to technologies other than TID1. Where it is desired to determine if remediation RID1 mitigates vulnerabilities other than VID1 only for TID1 (or some subset of set T), then flow can pass through optional block 230 after leaving block 206 and before arriving at block 208/210. At block 230, tester-hoster 250 (or another computer having access to S1 and S2) can form fifth and six sets S5 & S6 from sets S1 and S2, respectively, by selecting only VID members of sets S5 and S6 that correspond to technology TID1 (or the member technologies of some subset of set T).

Further, the methodologies discussed above can be embodied on a machine-readable medium. Such a machine-readable medium can include code segments embodied thereon that, when read by a machine, cause the machine to perform the methodologies described above.

Of course, although several variances and example embodiments of the present invention are discussed herein, it is readily understood by those of ordinary skill in the art that various additional modifications may also be made to the present invention. Accordingly, the example embodiments discussed herein are not limiting of the present invention.

What is claimed is:

1. An automated computerized method of determining one or more technology-appropriate remediations for a common aspect of vulnerability in a system, the method comprising:
    receiving one or more vulnerability identifications (VIDs) and descriptions thereof, respectively, that have a common aspect of vulnerability;
    in response to the receiving of the one or more VIDs, determining, by executing instructions on a processor of a computer, a remediation identification (RID) associated with the common aspect of vulnerability;
in response to the determining of the RID, creating, by executing further instructions on the processor of the computer, based upon the one or more VIDs and the descriptions thereof, a first machine-actionable map between the RID, one or more technology identifications (TIDs), and one or more action identifications (ACTIDs) for actions that remediate the common aspect of vulnerability represented by the RID, where the first machine-actionable map is a representation of the remediation candidate, wherein the creating of the first machine-actionable map includes:
    providing a plurality of machine-actionable second maps, each second map being between a given RID, at least two TIDs for which the given RID can be used, and two or more sets of ACTIDs, the two or more set of ACTIDs corresponding to the at least two TIDs, respectively;
    selecting one or more instances of the plurality of second maps, where the one or more selected instances of second maps represents the first machine-actionable map, the selecting including:
        indexing into the plurality of second maps using the RID to obtain a first subset of the plurality of second maps;
        determining a list of one or more TIDs that correspond to the one or more VIDs, the determining of the list including:
            determining, for each of the one or more VIDs, a technology genus associated with a given VID; and
            populating the list with TIDs of technology species associated with the technology genus; and
        eliminating members of the first subset that are specific to TIDs which are not present on the list; and
    expanding the first machine-actionable map to include an invasiveness value that is indicative of a degree to which implementing the remediation on a machine is invasive thereof; and
storing the first machine-actionable map.

2. The computerized method of claim 1, wherein:
    the receiving receives two or more VIDs and descriptions thereof, respectively; and
    the creating creates the first machine-actionable map between the RID, two or more TIDs, and the two or more action identifications (ACTIDs).

3. The computerized method of claim 1, wherein the creating of the first machine-actionable map includes:
    creating a machine-actionable map between the one or more TIDs and the RID; and
    expanding the machine-actionable map to include the one or more ACTIDs.

4. The computerized method of claim 1, wherein each ACTID represents one or more operations that remediate the common aspect of vulnerability represented by the RID for a given TID.

5. The computerized method of claim 4, wherein each operation is an automatically-machine-actionable type of operation.

6. The computerized method of claim 5, wherein each operation is a machine-language command.

7. The computerized method of claim 6, wherein the machine-language command is a set of one or more Java byte codes.

8. The computerized method of claim 1, wherein the description of a VID is provided in a substantially non-machine-actionable format.

9. The computerized method of claim 8, wherein the description of a VID includes substantially non-machine-actionable identifications of one or more technologies which are susceptible to a specific vulnerability corresponding to the VID.

10. The computerized method of claim 1, wherein a continuum of invasiveness classifies patching an operating system as being a more invasive type of remediation and classifies editing a file as being a less invasive type of remediation.

11. The computerized method of claim 10, wherein the continuum of invasiveness classifies editing a registry value as being a moderately invasive type of remediation.

12. The computerized method of claim 1, further comprising:
    expanding the first machine-actionable map to include a non-machine-actionable description of vulnerability corresponding to the RID.

* * * * *